United States Patent
Ito et al.

[11] Patent Number: 5,939,616
[45] Date of Patent: Aug. 17, 1999

[54] KNOCKING DETECTING SENSOR

[75] Inventors: Yasuo Ito; Yoshitaka Fujikawa, both of Nagoya, Japan

[73] Assignee: NGK Spark Plug Co., Ltd., Nagoya, Japan

[21] Appl. No.: 08/975,652

[22] Filed: Nov. 21, 1997

[30] Foreign Application Priority Data

Nov. 21, 1996 [JP] Japan .................................. 8-325998
Sep. 30, 1997 [JP] Japan .................................. 9-284494

[51] Int. Cl.⁶ .................................................. G01L 23/22
[52] U.S. Cl. .................................................. 73/35.11
[58] Field of Search ........................ 73/35.11, 35.13, 73/654, 514.34; 310/329

[56] References Cited

U.S. PATENT DOCUMENTS

| | | | |
|---|---|---|---|
| 4,399,705 | 8/1983 | Weiger et al. | 73/654 |
| 4,840,158 | 6/1989 | Komurasaki | 123/419 |
| 4,967,114 | 10/1990 | Komurasaki et al. | 310/329 |
| 5,398,540 | 3/1995 | Entenmann et al. | 73/35 |
| 5,440,933 | 8/1995 | Brammer et al. | 73/756 |

FOREIGN PATENT DOCUMENTS

| | | |
|---|---|---|
| 1-159467 | 6/1989 | Japan . |
| 6-508920 | 10/1994 | Japan . |
| 8-219871 | 8/1996 | Japan . |

*Primary Examiner*—John E. Chapman
*Attorney, Agent, or Firm*—Morgan, Lewis & Bockius LLP

[57] ABSTRACT

A knocking detecting sensor (1) includes a piezoelectric element plate (8) for detecting vibration due to knocking generated in an internal combustion engine and a main metallic sleeve (5) for supporting the piezoelectric element plate (8) on the side of one face. The sensor (1) is attached to a prescribed attaching unit (30) of an internal combustion engine. The piezoelectric element plate (8) is formed in a flat axis-symmetrical shape at a position relative to an axial line (O) that is substantially orthogonal to the attaching face (30a) of the attaching unit (30). The main metallic shell (5) has an opposite face (35) to the attaching face (30a) of the attaching unit (30), and has a notch portion (37) opening toward the opposite face (35) at a position a prescribed distance away from the axial line (O). By providing the notch portion (37), the center of gravity (G) of the sensor (1) can be corrected so that it approaches the axial line (O).

15 Claims, 11 Drawing Sheets

KNOCKING DETECTING SENSOR

BACKGROUND OF THE INVENTION

1. Field of the Invention

The present invention relates to a knocking detecting sensor attached to an internal combustion engine to detect knocking electrically.

2. Description of the Related Art

In order to detect knocking generated in an internal combustion engine of a motor vehicle, a sensor to detect vibration due to the knocking using a piezoelectric element has been widely used. Such knocking detecting sensors are classified into two kinds: a resonant type and a non-resonant type. The former type has a resonance point in a band corresponding to a knocking frequency and selectively detects only the vibration in the vicinity of the resonating frequency on the basis of a resonance phenomenon, thereby detecting the knocking. The latter type has a comparatively flat output characteristic without a specified resonance frequency and extracts the sensor output in a frequency band corresponding to knocking by using a bandpass filter, thereby detecting the knocking.

Generally, in the non-resonant type of knocking detecting sensor, a main metallic sleeve is arranged so that its bottom face contacts an attaching face on an attaching unit, and a screw member is inserted into a through hole of the main metallic sleeve and is screwed into a female screw hole in the side of the attaching unit to fix the main metallic sleeve and the attaching unit together. (See for example, TOKU HYO HEI 6-508920 and U.S. Pat. No. 5,398,540) Further, there is another type of sensor in which a male screw portion is integrally formed with a main metallic sleeve. This integrated body is screwed to a female screw hole in an attaching side. (See for example, Unexamined Japanese Patent Publication No. HEI. 1-159467). In that attachment, however, it is well known that the main metallic sleeve will vibrate (as seen from the attaching face, the vibration includes an amplitude component in a direction intersecting the attaching face) in a direction along an axial line of the screw member (namely, the coupling direction of the screw member). The vibration will occur around the outer edge portion of the main metallic sleeve when the axial line of the screw member is the center, and will resonate at a specified frequency. It is desirable for the non-resonant type knocking detecting sensor to have a flat output frequency characteristic. However, when resonance occurs as described above, the detected output level in a knocking band should be lowered, or otherwise the output frequency characteristic is susceptible to the influence of noise from the resonance, which leads to erroneous detection. Also, in the resonant type of knocking detecting sensor, resonance may occur in an undesired frequency by a similar or other cause, in which case, erroneous detection is likely to occur.

SUMMARY OF THE INVENTION

It is an object of the present invention to provide a knocking detecting sensor which can surely detect knocking with high accuracy.

The knocking detecting sensor according to the present invention is preferably constructed as follows.

The knocking detecting sensor includes: a piezoelectric element plate for detecting vibration due to knocking generated in an internal combustion engine and a main metallic sleeve for supporting the piezoelectric element plate on the side of one of its faces. The main metallic sleeve is attached to an attaching unit of the engine. The piezoelectric element plate is formed with an axis-symmetrical shape and positioned relative to the intersection of the axial line and the attaching face of the attaching unit. The main metallic sleeve has an opposite face forming portion that provides an opposite face between itself and the attaching face of the attaching unit. The opposite face forming portion has at least one of a concave or notch portion (hereinafter, "notch portion" is used to include a notch portion that has a concave shape) which opens in the surface of the opposite face forming portion. A corresponding projecting portion, which may have a convex shape, protrudes from the attaching face of the attaching unit. The notch and projecting portions are formed at positions a prescribed distance away from the axial line of the piezoelectric element plate.

Incidentally, in the present invention, the recitation "the notch portion or the projecting portion is formed a position a prescribed distance away from the axial line of the piezoelectric element plate" means that, for example, the center of gravity of the notch portion or the projecting portion is displaced from the axial line of the piezoelectric element plate. For example, if the opposite face forming portion on which the notch portion is formed is flat, the center of gravity of the notch portion means, when the opening of the notch portion is closed and the notch portion is treated as solid, the center of gravity of the main metallic sleeve is essentially that of a solid body.

The inventors of the present invention have found that when a notch portion or projecting portion is formed on the opposite face of the main metallic sleeve so that a non-resonant type of sensor provides an output frequency characteristic which is difficult to provide a resonance point for in the sensor output and is flat. Also, they found that a resonant type of sensor prevents resonance from occurring in a band other than the knocking frequency. Namely, in either type of knocking detecting sensor, the frequency characteristic for knocking detection is improved to detect the occurrence of knocking accurately and surely.

The reasons for the improvement due to the formation of the notch portion or projecting portion of the frequency characteristic of the sensor is considered to be one of the following.

(1) In the structure where the main metallic sleeve is screwed and fixed to the attaching face by the screw member, the screw force becomes larger approaching the fixing center from an outer edge portion. As shown in FIG. 19A, a flexible load distributed from the fixing center (i.e., the center axial line of the screw member) outwardly along the diameter direction is generated in the opposite face forming portion. The attaching force between the opposite face and the attaching face is decreased approaching the outer edge portion from the fixing center. The opposite face may be formed spaced away from the attaching face. As a result, at the opposite face forming portion of a main metallic shell vibration in a direction intersecting the attaching face is easily generated in the outer edge portion. On the other hand, as shown in FIG. 19B, if a notch portion is formed on the opposite face forming portion, a thin thickness portion is formed in the flange above the notch portion. Then, when the screw force is applied by the screw member, the thin thickness portion slightly flexes in the direction in which the screw member is screwed to absorb any warp that raises the outer edge portion. This arrangement improves the attachment of the opposite face of the opposite face forming portion to the attaching face. As a result, vibration with an amplitude component in the direction intersecting the attaching face is prevented. Consequently, the frequency characteristic of the knocking detecting sensor is improved.

(2) Dynamic parameters controlling the resonance phenomenon such as the center of gravity position and the inertia tensor component of the main metallic sleeve (or whole of the sensor) are changed by forming the notch portion or the projecting portion, and thereby the resonance point is not generated.

Assuming that the volume of the whole of the main metallic sleeve including the volume of the notch portion or the projecting portion is V and the volume of the notch portion or the projecting portion alone is K, the ratio of K/V is preferably adjusted in the range of 0.01 to 0.2. If K/V is less than 0.01, the frequency characteristic of the knocking detecting sensor with a notch portion or a projecting portion is not improved. On the other hand, if K/V exceeds 0.2, some knocking detecting sensors are likely to generate resonance. Preferably, the value of K/V is set to about 0.015.

The notch portion is formed to be open on the opposite face which is convenient for improving the frequency characteristic of the knocking detecting sensor. The reason for this is the thin thickness portion can be formed in the longitudinal direction of the screw member in the main metallic sleeve. Since the thin thickness portion can flex, the attachment of the opposite face forming portion to the attaching face is further improved. More specifically, the notch portion is formed in the opposite face forming portion so that the depth of the notch portion is in the same direction as the axial line of the piezoelectric element plate. The thickness of the notch portion is reduced at the forming position of the notch portion.

The notch portion is formed to move the center of gravity of the sensor closer to the axial line of the piezoelectric element plate. For example, many non-resonant types of sensors include a structure in which a connecting member for receiving an output from the piezoelectric element plate protrudes from the side of the sensor body. If such a connecting member is provided, the center of gravity of the sensor is displaced from the axial line of the piezoelectric element plate. Owing to the shape of the sensor, this generates resonance in the sensor. In this case, the notch portion is formed as described above so that the center of gravity of the sensor is corrected so that it is closer to the axial line of the piezoelectric element plate. Accordingly, the arrangement has another advantage which is the prevention of resonance of the sensor due to the displacement of the center of gravity from the axial line.

Next, when the notch portion is formed in the opposite face, the projecting portion is attached to the notch portion of the attaching face. In this arrangement, the projecting portion also functions to attach the sensor on the attaching face. In addition, as described later, when the sensor is attached to the attaching unit by the screw, the projecting portion also acts as detent to prevent the sensor from rotating by engaging with the notch portion in the attaching face during the screwing.

In the above-described sensor, the piezoelectric element plate is formed in a ring shape. Further, the main metallic sleeve can be formed to include a cylindrical or cylindrical-column passing-through portion and a flange portion integrally formed on a side of the passing-through portion and extending outwardly along a circumferential direction of the passing-through portion. The flange portion constitutes the previously mentioned opposite face forming portion. In this case, the piezoelectric element plate is inserted into the inserting portion of the main metallic sleeve from a direction opposite to the flange portion. A ring-shaped end face of the flange portion opposite to the piezoelectric element plate supports the piezoelectric element plate. The other end face is the face opposite the attaching face when the sensor is attached to the attaching unit. This structure is used for non-resonant type knocking detecting sensors. According to the above feature, the detecting accuracy of the non-resonant type of sensor is improved.

When the opposite face forming portion is formed as the flange portion, a harmful vibration having an amplitude component in the axis direction is generated around the outer peripheral portion of the flange portion, thereby damaging the frequency characteristic. However, if the notch portion is formed to open in the end face opposite to the attaching face, the harmful vibration can be restrained because of the fact that the flange portion is thinner in the position of the notch portion, thereby improving the detecting accuracy of the sensor.

Further, in the above knocking detecting sensor, the outer periphery of the main metallic sleeve is covered by and integrally molded with a resin case. The resin case includes a cylinder portion with an open tip that is formed integrally with the resin case and protrudes sidewardly. In this case, it is preferable to further improve the detecting accuracy of the sensor by forming the notch portion at a position corresponding to the connector portion at the periphery of the axial line with respect to the opposite face forming portion of the main metallic shell. In other words, if the connector portion is formed, the center of gravity of the sensor is displaced toward the side of the sensor with the connector portion attached. Resonance is generated due to the displacement of the center of gravity. Accordingly, the notch portion is formed in the opposite face forming portion at a position near the connector portion to reduce the weight of the main metallic sleeve by an amount of the notch portion. The increase in weight due to the connector portion is partially eliminated by formation of the notch portion and the resonance is thereby restrained. On the other hand, when a projecting portion if formed instead of the notch portion, the projecting portion is formed on a side of the sensor opposite from the connector portion with respect to the center axial line of the piezoelectric element plate to thereby obtain substantially the same effect.

The knocking detecting sensor is arranged on the attaching unit with the opposite face of the main metallic sleeve contacting the attaching face and a screw member penetrating through the main metallic sleeve screwed into a female screw portion formed in the attaching unit. As described in reference to FIGS. 19A and 19B, the closer to the outer edge portion of the main metallic sleeve, the attaching force between the opposite face and the attaching face is reduced, which makes the generation of harmful vibration likely. This vibration is a cause of the resonance phenomenon. Therefore, the above-described structure is used with the sensor of the present invention to thereby restrain the resonance and improve the knocking detecting accuracy.

The notch portion engages with a projecting portion formed on the attaching face and the projecting portion engages with a notch portion formed thereon so that they prevent the sensor from rotating while the screw member is screwed into the female screw portion. In other words, the notch portion formed to adjust the center of gravity of the sensor can be used as a stopper or detent so that the sensor can be easily attached. In a sensor that uses a bolt-nut arrangement to fix the piezoelectric element plate to the main metallic sleeve, in the process of tightening the nut, the above notch portion can be used as a detent for the main metallic sleeve.

DETAILED DESCRIPTION OF THE INVENTION

A detailed description of the present invention will be described below with reference to the accompanying drawings.

With reference to the drawings, an explanation will be given of the embodiments of the present invention.

Figure 1:
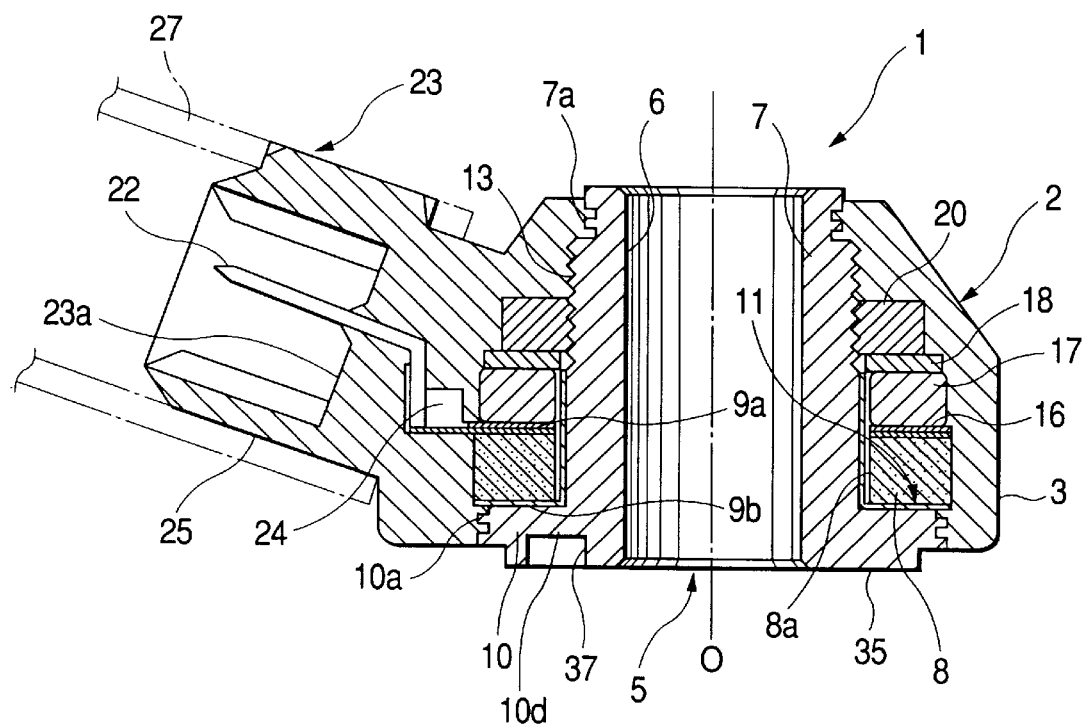
FIG. 1 is a side sectional view showing the knocking detecting sensor according to the present invention.
Figure 2:
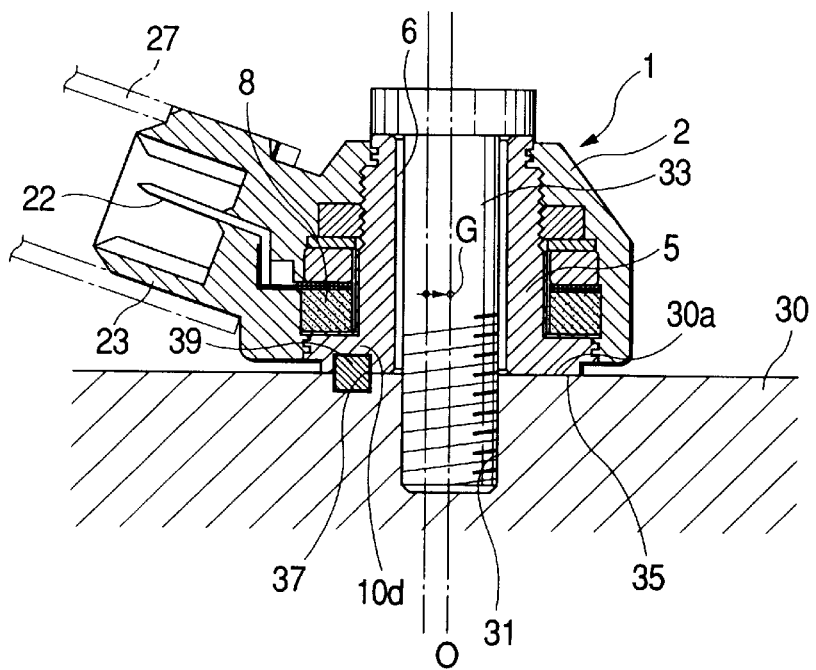
FIG. 2 is a schematic view showing the attachment of a knocking detecting sensor to an attaching unit.

FIG. 1 shows a sectional view of the structure of a knocking detecting sensor (hereinafter "sensor"). The sensor of this embodiment of the present invention is configured as a non-resonant type sensor. The sensor 1 includes a case of synthetic resin (hereinafter "case") 2, a main metallic sleeve 5, a piezoelectric element plate 8, and a connection terminal portion 22. As shown in FIG. 2, the sensor 1 is arranged on an attaching unit 30 such that the opposite face 35 of the main metallic sleeve 5 is in contact with an attaching face 30a of the attaching unit 30 on the side of an internal combustion engine. By screwing a screw member 33, which passes through a through-hole 6 of the main metallic sleeve 5, into a female screw portion 31 formed in the attaching unit 30, the sensor 1 is attached to the attaching unit 30 in such a relative position where the axial line O of the piezoelectric element plate 8 is substantially orthogonal to the attaching face 30a.

As shown in FIG. 1, the case 2 includes a body 3 formed in a cylindrical shape and a cylinder portion 25 integrated thereto so that it extends outwardly from its side. For example, the case 2 is injection-molded integrally with the main metallic sleeve 5 and piezoelectric element plate 8. The main metallic sleeve 5 includes a cylindrical passing-through portion 7 with a through-hole 6 formed in an axial direction, and a flange portion 10 integrally formed on the lower side of the passing-through portion 7 and extending outwardly along a circumferential direction of the passing-through portion 7. The flange portion 10 includes a supporting face 11 supporting the lower face of the piezoelectric element plate 8. The flange portion 10 also includes an opposite face 35 at the end surface opposite to the supporting face 11.

On the outer peripheries of the tip end of the passing-through portion 7 and flange portion 10, a plurality of uneven portion 7a and 10a (for example, an annular ring-shaped convex portion along the periphery direction) are formed in a radial direction. These portions serve to improve the coupling strength because during injection molding the resin of the case 2 is intruded between the portion. A screw portion 13 is formed circumferentially on the side of the passing-through portion 7 slightly lower than the uneven portion 7a.

The piezoelectric element plate 8 has a flat axis-symmetrical shape, e.g., a flat circular plate shape having a ring shape with a hole portion 8a formed centrally therethrough in the thickness direction (axial line direction). The piezoelectric element plate 8 is provided with electrode plates 9a, 9b arranged on both its top and bottom surfaces. In this state, the piezoelectric element plate 8 is fit over the passing-through portion 7 of the main metallic sleeve 5 by way of the hole portion 8a until it is near the flange portion 10. Further, an insulating plate 16, a ring 17, and a washer 18 are fit over the passing-through portion 7 and stacked on the piezoelectric element plate 8 in this order. In addition, the screw portion 13 is formed on the outer periphery of the passing-through portion 7. The above members 9b, 8, 9a, 16, 17, and 18 are tightened and held between the flange portion 10 and the nut member 20. Thus, the piezoelectric element plate 8 is supported by the supporting face 11 of the flange portion 10 on its end face on the side toward the electrode plate 9b.

Figure 3:
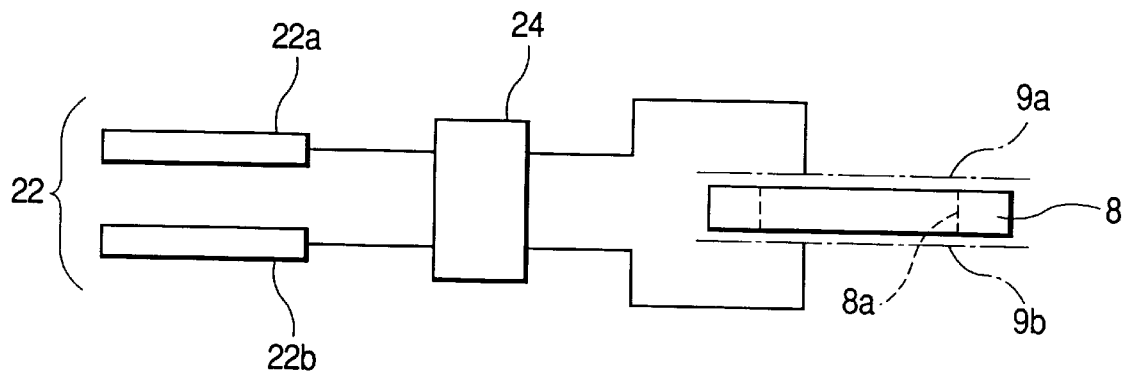
FIG. 3 is a schematic view showing the method of connecting a piezoelectric element plate to a connection terminal portion.

An output from the piezoelectric element plate 8 is extracted by the connection terminal portion 22. As shown in FIG. 3, for example, the connection terminal portion 22 is made of terminal metal fittings 22a, 22b. One end of each of the terminal metal fittings 22a, 22b is connected to the electrode plates 9a, 9b, respectively, through an integrated resistance 24. The other ends of terminal metal fittings 22a, 22b penetrate through the case 2 and protrude into the cylinder portion 25 as shown in FIG. 1 as part of the connector portion 23. A female coupler 27 is fit over the connector portion 23 so that the connection terminal portion 22 is electrically connected to a circuit portion (not shown).

Figure 5:
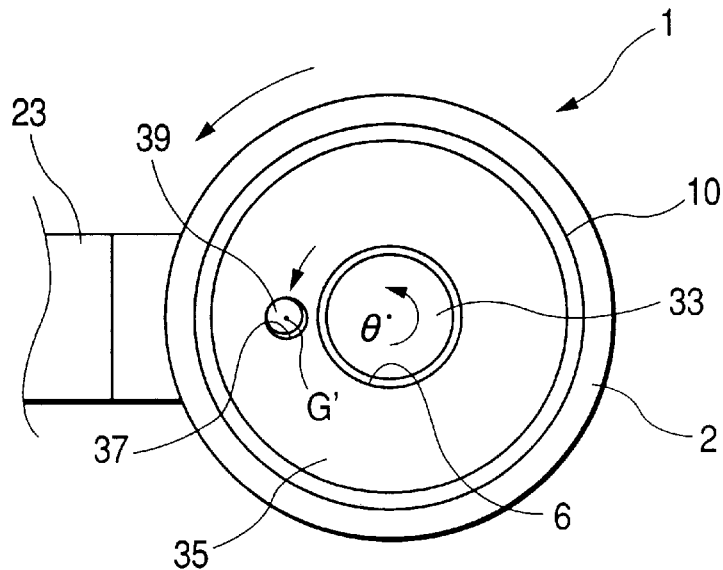
FIG. 5 is a bottom view showing the operation of the knocking detecting sensor of FIG. 1.

As shown in FIGS. 2 and 5, a substantially circular notch portion 37 opens in the opposite face 35 of the flange portion 10 on the side of the passing-through portion 7 on which the cylinder portion 25 is located. The notch portion 37 is formed so that its depth direction is in the axial line direction of the flange portion 10. The thickness of the flange portion 10 is reduced beneath the bottom of the notch portion 37 to thereby form a thin thickness portion 10d.

The end of the through-hole 6 (which functions as a screw insertion hole) at the bottom face of the flange portion 10 has a donut-shape. The piezoelectric element plate 8 has a ring shape in which its outer peripheral edge and inner peripheral edge are substantially concentric. The piezoelectric element plate 8 is fitted over the passing-through portion 7 as previously discussed. Accordingly, the center axial line of the flange portion 10 substantially coincides with the center axial line O of the piezoelectric element plate 8. Therefore, the center of gravity of the notch portion 37 is displaced from the axial line O of the piezoelectric element plate 8. Incidentally, the center of gravity of the notch portion 37 means the center of gravity of a virtual solid body, when the opposite face 35 is virtually extended to close the opening of the notch portion 37. The closed space in the notch portion 37 is regarded as a virtual solid.

As shown in FIG. 5, when the opposite face 35 of the flange portion 10 is viewed along the center axial line O, the position of the center of gravity G' of the opening portion of the notch portion 37 is displaced from the center of gravity of the ring-shaped opposite face 35 (the center axial line position O of the piezoelectric element plate 8).

Now, an explanation will be given of the method of attaching and using the knocking detecting sensor 1.

Figure 4:
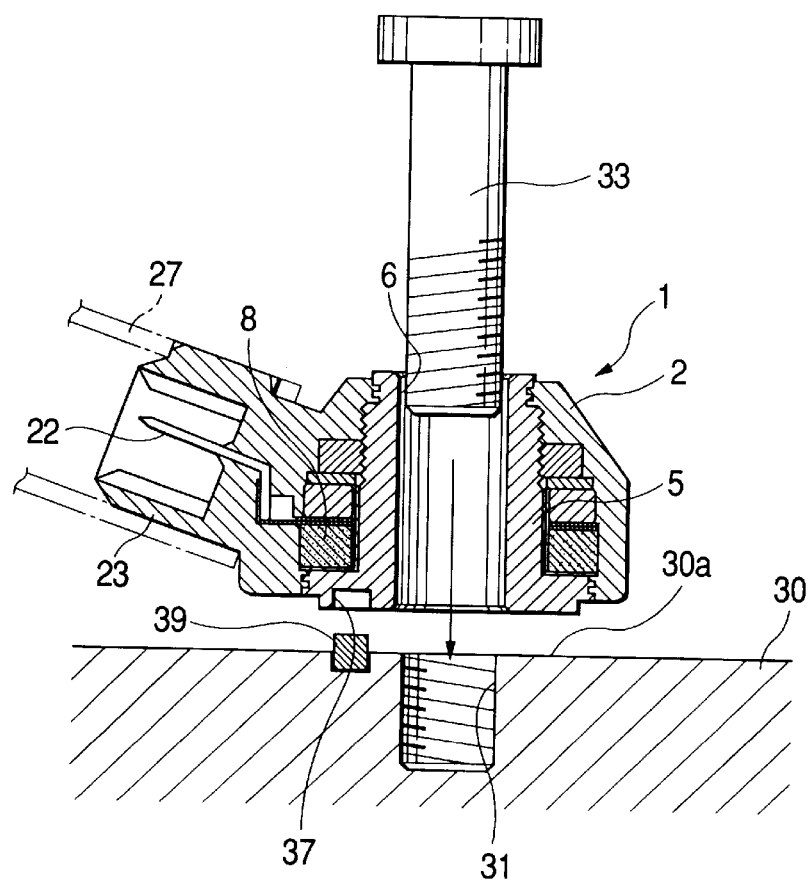
FIG. 4 is an explanation view of the method of attaching a knocking detecting sensor.

As shown in FIG. 4, the sensor 1 is arranged on the attaching unit 30 and the notch portion 37 of the main metallic sleeve 5 engages with the projecting portion 39 in the attaching face 30a at a position in proximity to the opening of the female screw portion 31. When the through-hole 6 of the main metallic sleeve 5 is aligned with the female screw portion 31, the screw member 33 is passed through the through-hole 6 and its tip is screwed into the female screw portion 31. Thus, the attaching of the sensor 1 to the attaching unit 30 is completed. As shown in FIG. 5, since the notch portion 37 is engaged with the projecting portion 39 in the side of the attaching face 30a, the sensor 1 is prevented from rotating when the screw member 33 is screwed into the female screw portion 31. Incidentally, for example, the projecting portion 39 in the side of the attaching face 30a is formed in such a manner that the projecting portion 39 has a male screw portion formed on an outer periphery of one end side. This male screw portion is screwed into a female screw hole formed in the side of the attaching portion 30 so that the other end side protrudes from the attaching face 30a.

When sensor 1 is thus attached, the vibration generated due to knocking is transmitted to the piezoelectric element plate 8 through the main metallic sleeve 5 and the piezoelectric element plate 8 converts the vibration into an electric signal by a piezoelectric effect. The electric signal is supplied to the circuit portion (not shown) through a cable. The circuit portion for detecting the output signal from the sensor 1 is provided with a band-pass filter to detect only the signal at the frequency band corresponding to knocking.

Figure 19A:
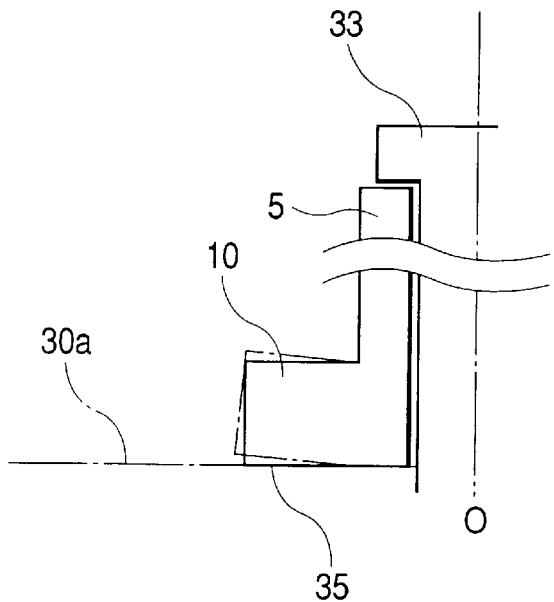
FIGS. 19A and 19B are explanation views of the arrangement of a notch portion and a thin thickness portion.

In this configuration, it is difficult for the sensor 1 to generate resonance and the vibration in the cylinder portion 25 is restrained. Accordingly, the knocking can be detected with high accuracy. The reason for this is the following. As shown in FIG. 2, when the main sleeve 5 is tightened and fixed to the attaching face 30a by the screw member 33, the tightening force is larger the closer to the fixing center, e.g., the axial line of the screw member 33 which nearly corresponds to the center axial line O. In this case, as shown in FIG. 19A, a flexible load distributed in the diameter direction is generated in the flange portion 10 of the main sleeve 5, and the attaching force between the opposite face 35 and the attaching face 30a becomes smaller the closer to the peripheral edge portion of the flange portion 10. As a result, in the peripheral edge portion of the flange portion 10, the resonance is likely generated because the harmful vibration has an amplitude in a direction which intersects the attaching face 30a, i.e., the axial line direction of the screw member 33.

Figure 19B:
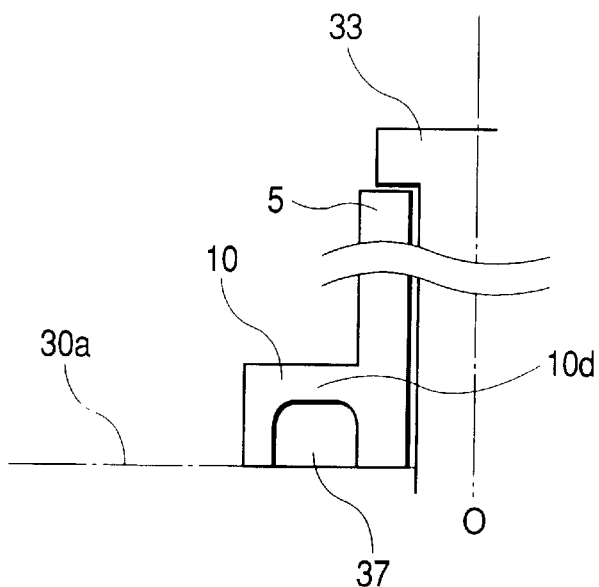

However, as shown in FIG. 19B, if the notch portion 37 is provided in the flange portion 10 and a thin thickness portion 10d is formed, the thin thickness portion 10d is slightly flexed when the tightening force of the screw member 33 is applied. As a result, the warp tending to raise the peripheral edge portion of the flange portion 10 is absorbed. Accordingly, the attachment of the opposite face 35 to the attaching face 30a is improved. It is difficult to generate the harmful vibration in the flange portion 10, and thereby the frequency characteristic of the knocking detecting sensor 1 is improved. In addition, since such a resonance is prevented or restrained, a contact failure of the terminal contact due to vibration rarely occurs.

Another reason for the restraint on the generation of resonance is the following. Dynamic parameters controlling the resonance phenomenon such as the center of gravity position and the inertia tensor component of the main metallic sleeve 5 (or whole sensor 1) is changed by forming the notch portion 37. In this case, if the resonance frequency of the dynamic system including the sensor 1 is outside the vibration frequency band generated by a general internal combustion engine, it is possible to make the resonance point difficult to generate. For example, as shown in FIG. 2, if the notch portion 37 is formed in the flange portion 10 so that the position of the center of gravity G' of the sensor 1 is offset from the axial line O, the resonance phenomenon may be effectively restrained. Incidentally, the position of the center of gravity G can be adjusted by varying the size and the position of the notch portion 37.

The most effective way to restrain the resonance of sensor 1 is to form the notch portion 37 at a position near the connector portion 23. However, even if the notch portion 37 is formed elsewhere, the resonance can be restrained to some degree. For example, the notch portion 37 may be formed at a position opposite to that shown in FIG. 1 with respect to the axial line O.

Assuming that the volume of the whole of the main metallic sleeve 5 including the volume of the notch portion 37 is V and the volume of the notch portion (i.e., the volume of the above described substantially cylindrical closed space) is K, then the ratio K/V is preferably in the range of 0.01 to 0.2 to achieve the desired resonance restraint. Preferably, the value of the K/V ratio is set to about 0.015.

Various types of modified embodiments of the knocking detecting sensor 1 are described below.

Figure 6:
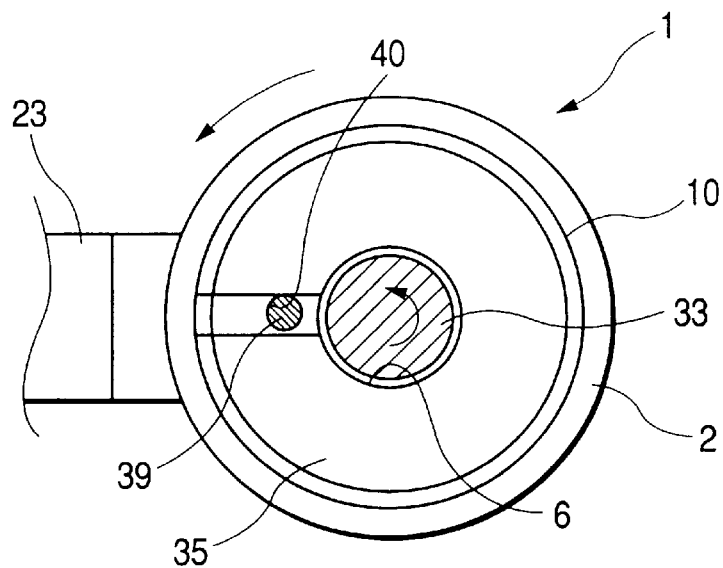
FIG. 6 is a bottom view showing a first modified embodiment of the knocking detecting sensor.
Figure 14:
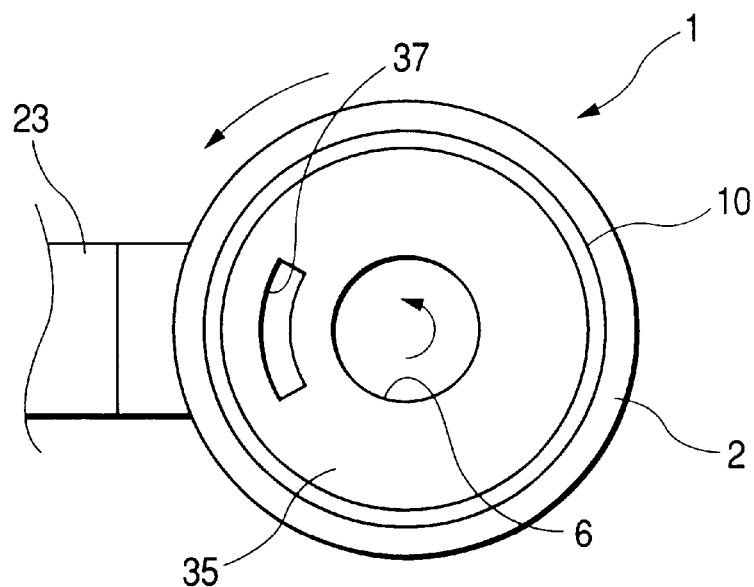
FIG. 14 is a bottom view showing a seventh embodiment of the knocking detecting sensor.
Figure 15:
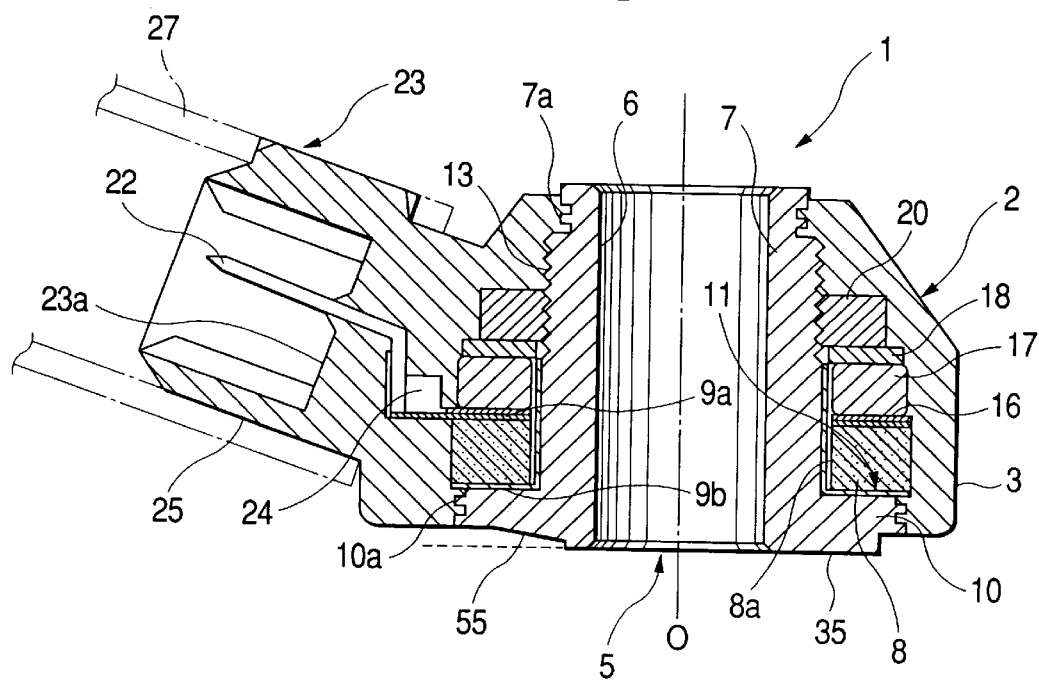
FIG. 15 is a side sectional view showing an eighth embodiment of the knocking detecting sensor.
Figure 16:
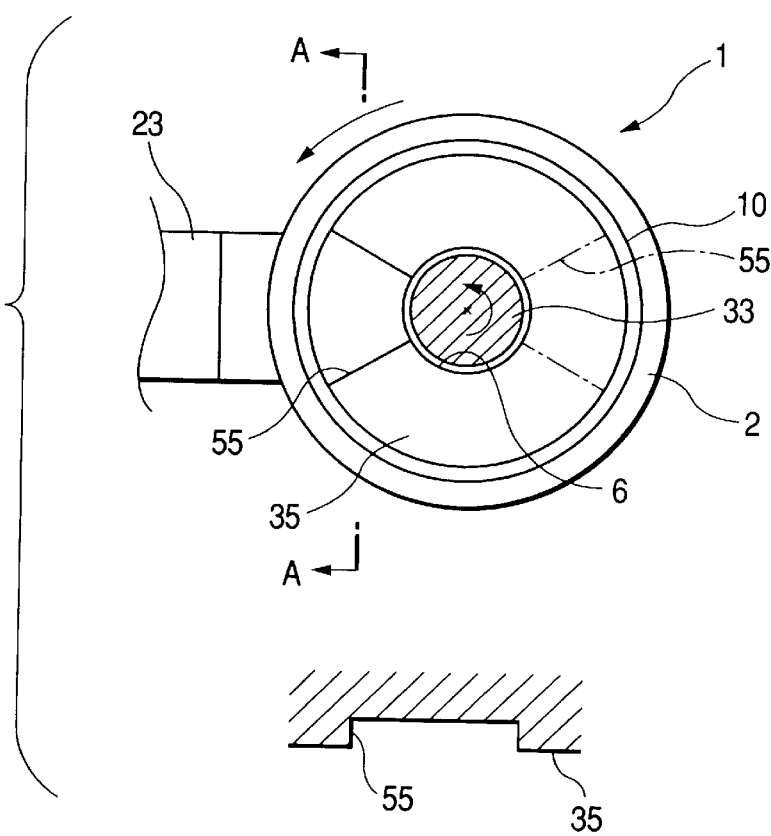
FIG. 16 is a bottom view of FIG. 15.

The notch portion 37 can be rectangular in spite of the circular flat shape. FIG. 14 shows an embodiment in which the notch portion 37 is formed to be an arc-shape (or sector-shape). In addition, as shown in FIG. 6, in place of the notch portion 37, a groove-shaped notch portion 40 may be formed. Both ends of the notch portion 40 open to the inner and outer peripheries of the flange portion 10. Further, FIGS. 15 and 16 show embodiments in which a part of the flange portion 10 on the side of the opposite face 35 is partially cut to thereby form a substantially sector-shaped notch portion 55. As shown in FIG. 15, the bottom face of the notch portion 55 is tapered away from the plane of the attaching face 35 and downwardly to the outer periphery in the diameter direction of the flange portion 10. Incidentally, the notch portion 55 is formed at a position near the connector portion 23. However, as indicated by the dotted lines in FIG. 16, another notch portion 55 having the same shape can be formed at a position opposite the axial line O from the first notch portion 55 in lieu of or with the first notch portion 55.

Figure 7:
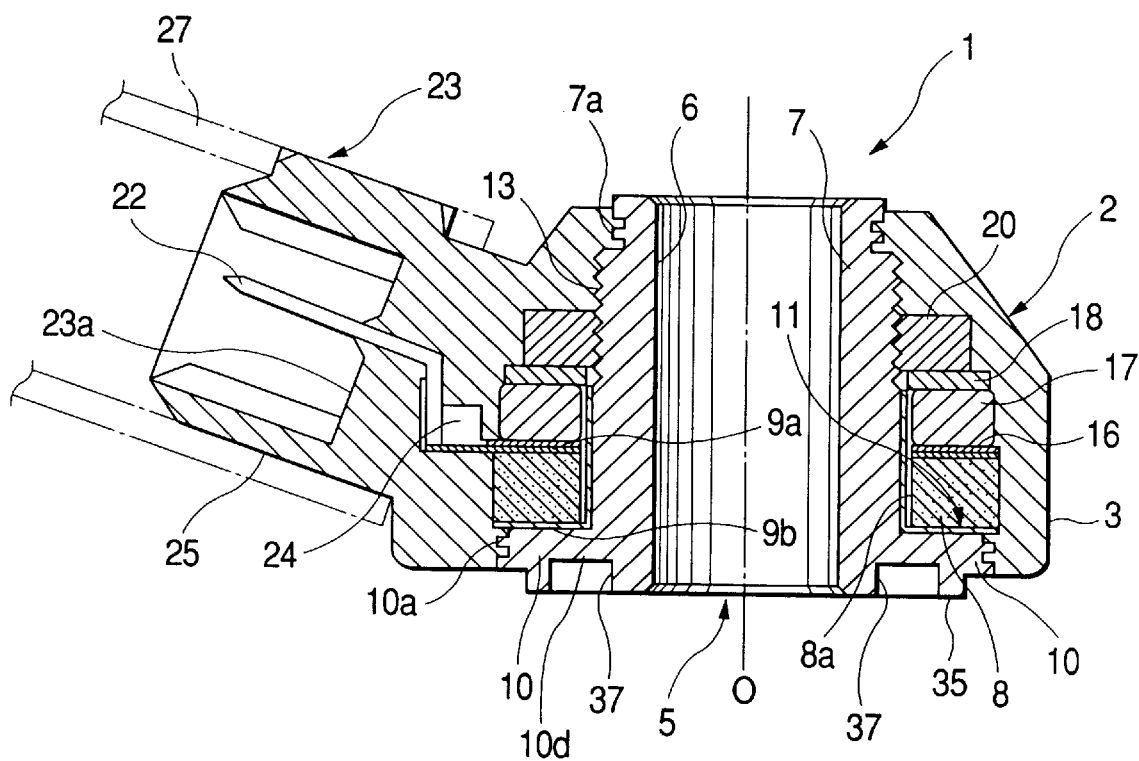
FIG. 7 is a side sectional view showing a second modified embodiment of the knocking detecting sensor.
Figure 8:
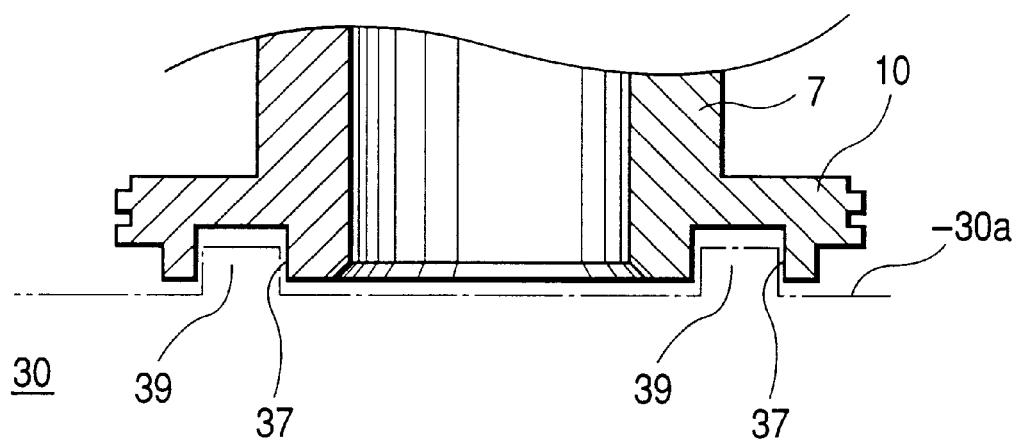
FIG. 8 is a schematic sectional view showing an example of the attachment of the knocking detecting sensor as shown in FIG. 7.
Figure 9:
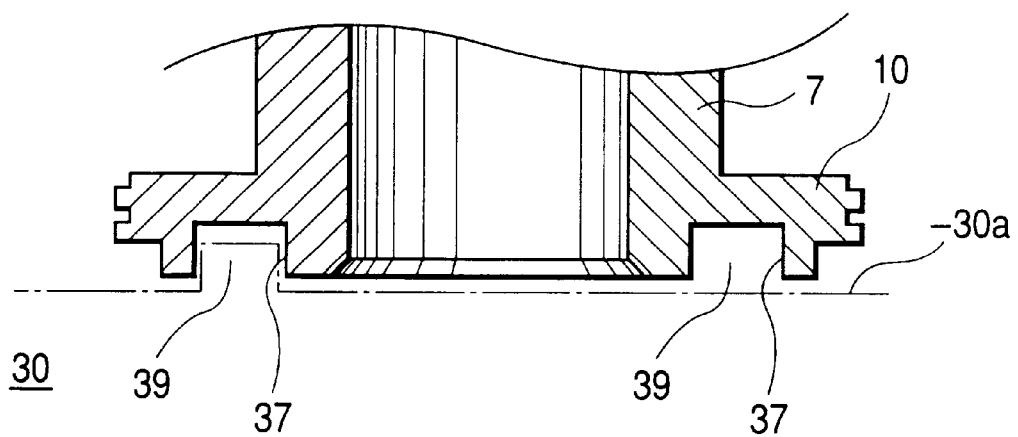
FIG. 9 is a schematic sectional view showing another example of the attachment of a knocking detecting sensor.
Figure 10:
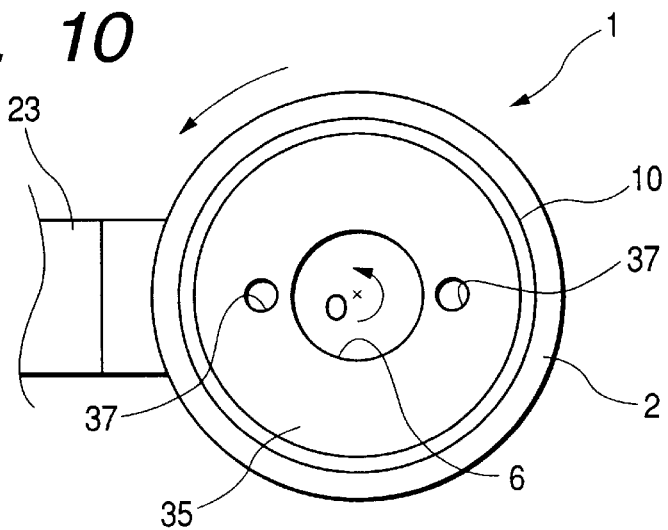
FIG. 10 is a bottom view showing a third embodiment of the knocking detecting sensor.

As shown in FIG. 7, a plurality of notch portions 37 can be formed in the flange portion 10. FIG. 10 is a bottom view of FIG. 7 and it shows two notch portion 37 formed so that one is on the side near the connector portion 23 and another is formed in the opposite side with respect to the center axial line O. Accordingly, two cylindrical portions 39 can be formed in the attaching unit 30 to engage with the respective notch portion 37 as shown in FIG. 8. Alternatively, only one cylindrical portion 39 is formed to engage with either one of the notch portions 37 as shown in FIG. 9.

Figure 11:
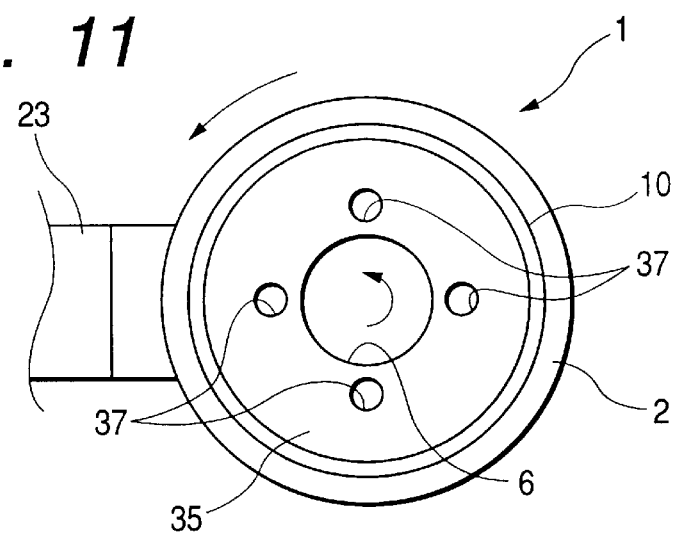
FIG. 11 is a bottom view showing a fourth embodiment of the knocking detecting sensor.
Figure 12:
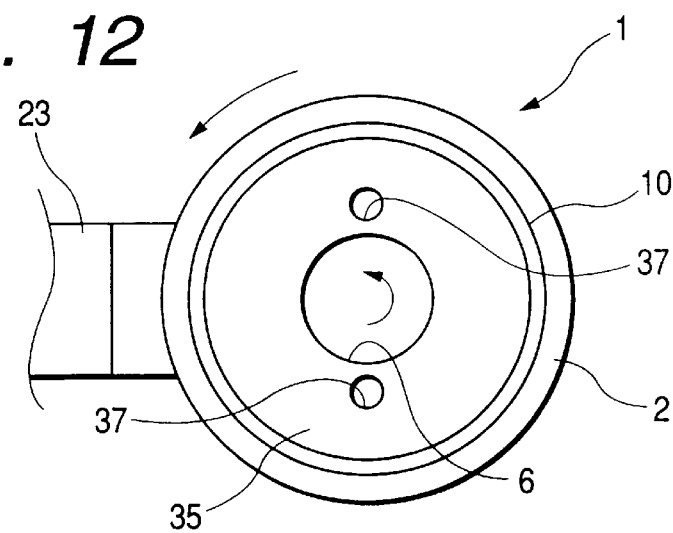
FIG. 12 is a bottom view showing a fifth embodiment of the knocking detecting sensor.
Figure 13:
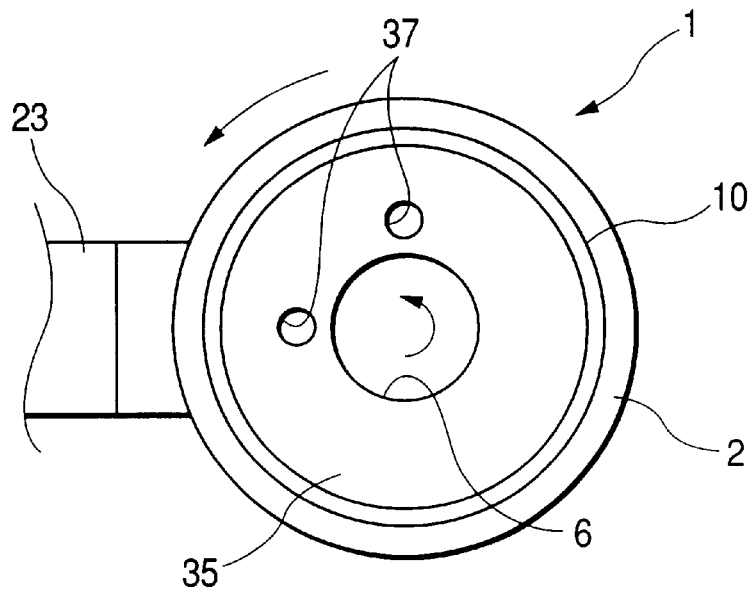
FIG. 13 is a bottom view showing a sixth embodiment of the knocking detecting sensor.

FIG. 11 shows an embodiment in which two additional notch portion 37 are arranged at right angle positions from the notch portions 37 as shown in FIG. 10, thereby providing four notch portions 37 in total. Alternatively, as shown in FIG. 12, two notch portion 37 may be arranged at right angle positions from the two notch portions 37 shown in FIG. 10. This arrangement of the notch portions 37 is better than the others for restraining resonance. On the other hand, in the embodiment shown in FIG. 13, the notch portion 37 in FIG. 5 and the other notch portion 37 are arranged at a right angle position, thereby forming two notch portions 37.

Figure 17:
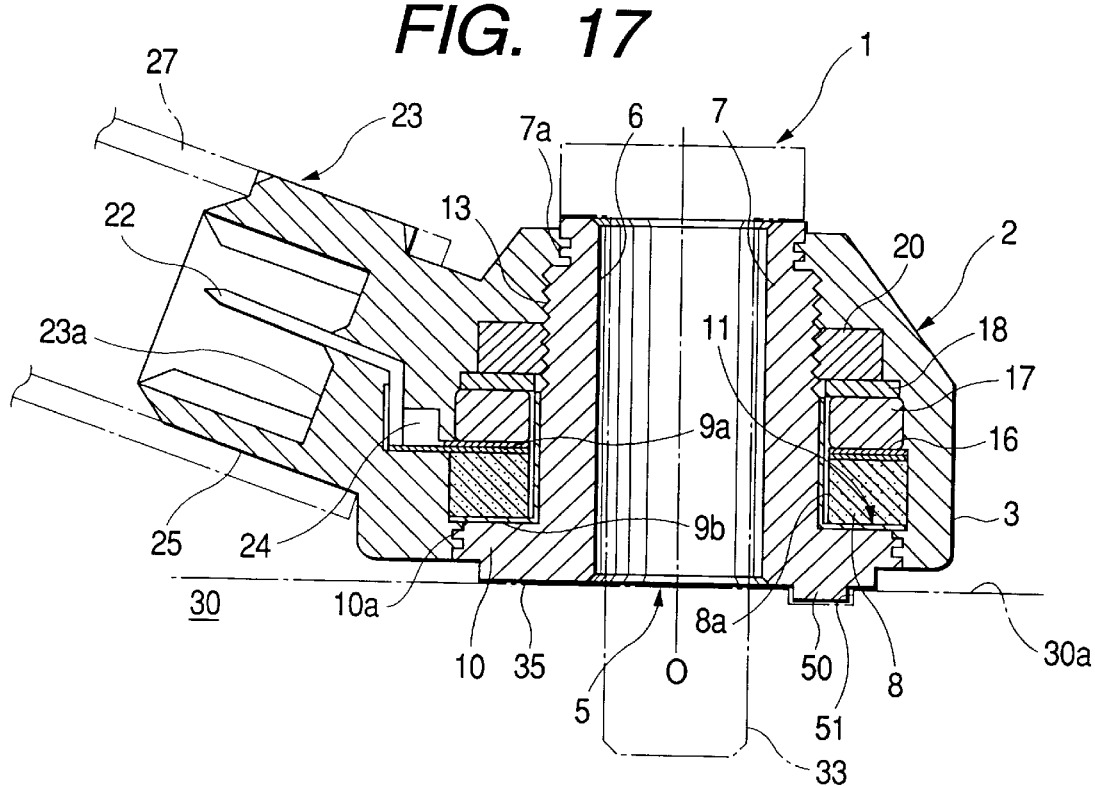
FIG. 17 is a side sectional view showing a ninth embodiment of the knocking detecting sensor.

FIG. 17 shows another embodiment with cylindrical portion 50 formed in the opposite face 35 of the flange portion 10. Preferably, this cylindrical portion 50 has a columnar shape and prevents or restrains the resonance of the sensor 1 similarly to a notch portion 37. The reasons for the prevention or restraint of the resonance by forming the cylindrical portion 50 are the following. Dynamic parameters that control the resonance phenomenon, such as the center of gravity position and the inertia tensor component of the main metallic sleeve 5 (or whole of the sensor 1), are changed by forming the cylindrical portion 50. The cylindrical portion 50 engages with a notch portion 51 in the attaching face 30a of the attaching unit 30 and prevents rotation of the sensor 1 during attachment of the sensor 1 to the attaching unit 30 by the screw member 33.

Figure 18:
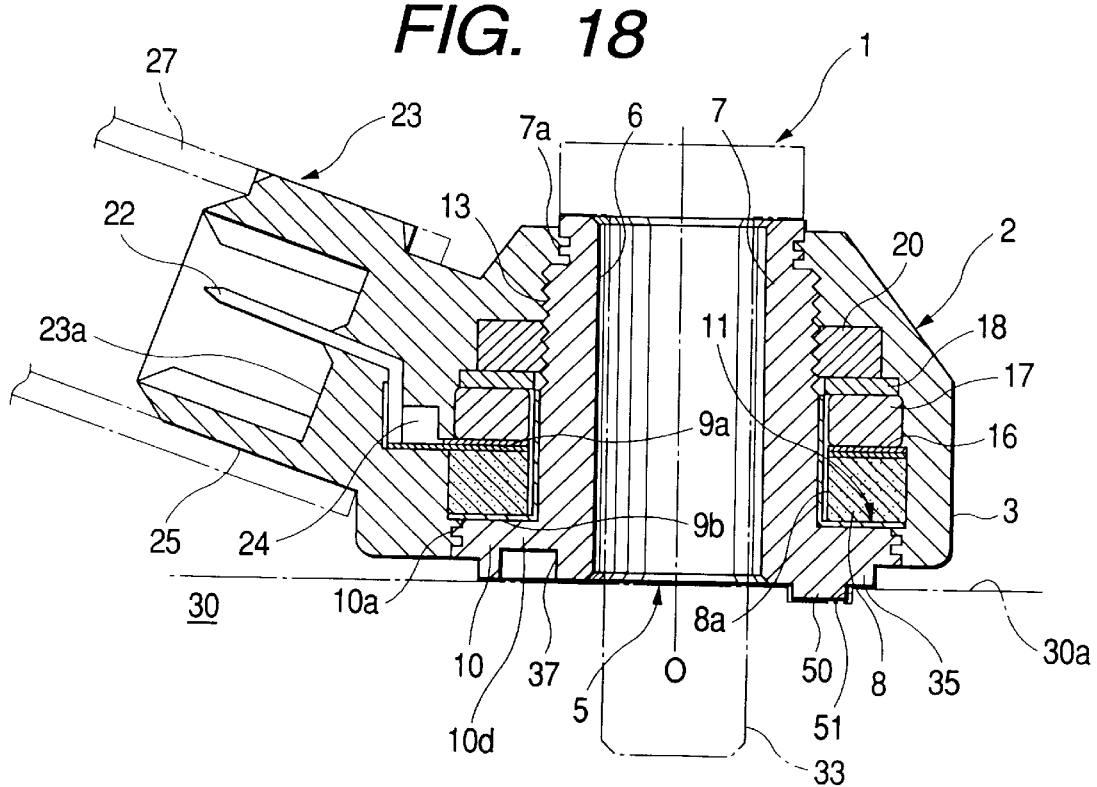
FIG. 18 is a side sectional view showing a tenth embodiment of the knocking detecting sensor.

FIG. 18 shows another embodiment of the sensor 1 having a notch portion 37 and a projecting portion 39 formed thereon.

The above-described embodiments have been described with respect to the non-resonant type of knocking detecting sensors. However, the present invention can be applied to a resonance type of knocking detecting sensor. In the resonance type, resonance except for the knocking frequency is prevented and restrained and thereby the knocking detecting accuracy is improved.

EXAMPLE

The respective elements of the knocking detecting sensor 1 as shown in FIG. 1 were made with the following sizes and materials. First, the piezoelectric element plate 8 was formed as a sintered body of lead zirconate titanate (PZT) with an outer diameter of 23 mm $\phi$, an inner diameter 15 mm, and a thickness of 2.5 mm. The main metallic sleeve 5 was made of carbon steel (JIS SWCH25K) and its flange portion 10 had an outer diameter 23 mm $\phi$, an inner diameter 8.5 mm $\phi$, and a thickness of 3 mm. The notch portion 37 was formed with an inner diameter of 6 mm and a depth of 1.5 mm. Further, a distance d between the center of gravity G' of the opening of the notch portion 37 and the center of the flange portion 10 (the axial line O) was set to be 8.0 mm. Further, the ratio K/V was set to be 0.015 where V is the volume of the whole of the main metallic sleeve 5 including the volume of the notch portion 37, and K is the volume of the notch portion 37. For comparison, a sensor 1 without a notch portion 37 was also formed.

Figure 20A:
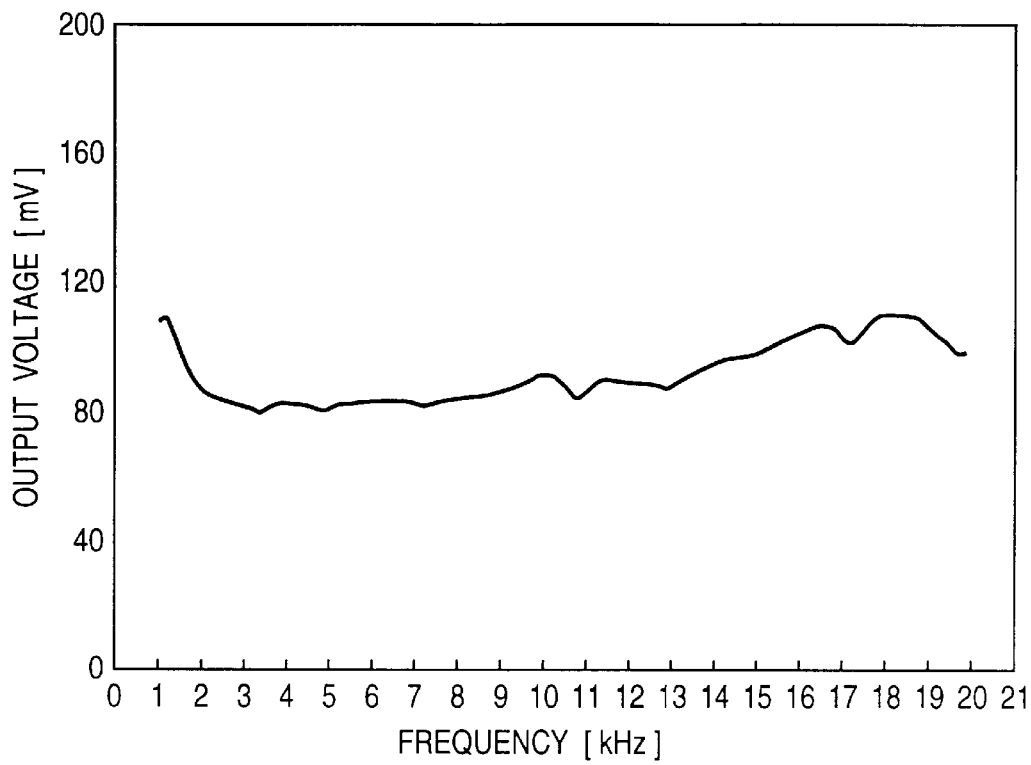
FIGS. 20A and 20B are profiles showing measurement examples of the frequency characteristic in the knocking detecting sensor in an example and a comparative example, respectively.
Figure 20B:
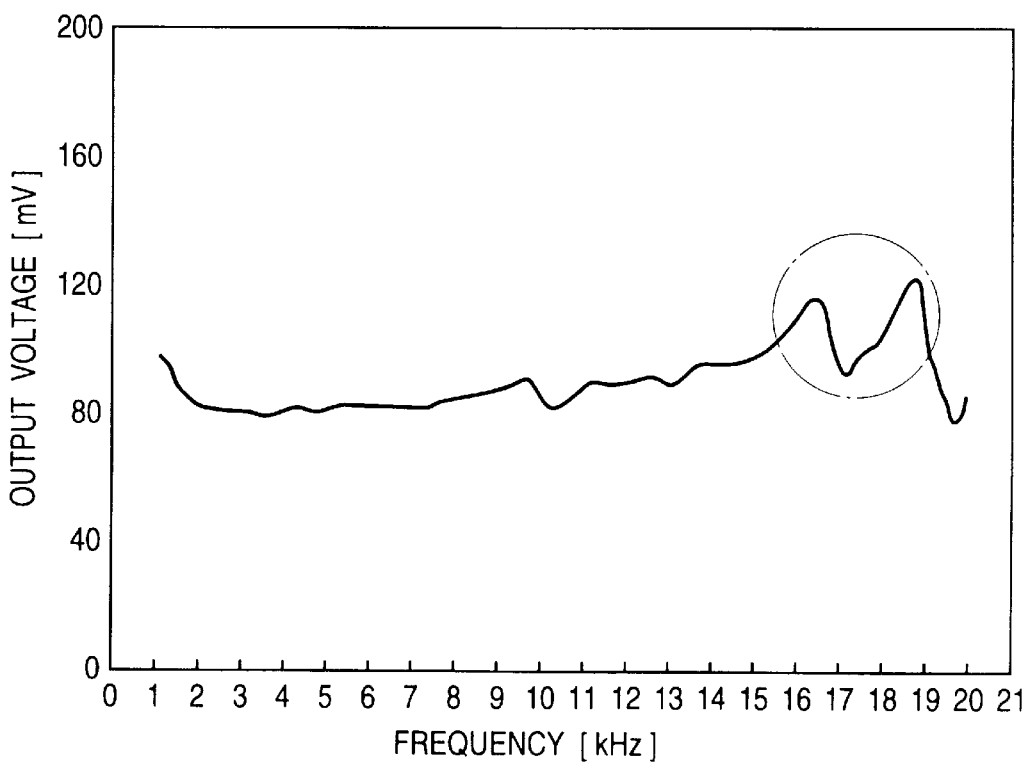

These knocking detecting sensors were attached to a prescribed meter, and their frequency characteristics were measured by measuring the output voltage at a vibrated acceleration of 3G (where G is gravitational acceleration) and a vibration frequency varying in the range of 1 to 20 kHz. FIGS. 20A and 20B show the measurement results.

FIG. 20A shows the frequency characteristic of the embodiment of a sensor 1 with the notch portion 37. FIG. 20B shows the frequency characteristic of the sensor 1 without a notch portion 37. Specifically, in the sensor 1 without a notch portion 37, the peaks of the output (represented by the phantom line circle) are attributable to resonance in the respective ranges of 16–17 kHz and 18–19 kHz. On the other hand, in the sensor 1 with a notch portion 37, a flat and good frequency characteristic with no peak is obtained.

What is claimed is:

1. A knocking detecting sensor comprising:
   a piezoelectric element plate for detecting vibration due to knocking generated in an internal combustion engine; and
   a main sleeve for supporting said piezoelectric element plate on said main sleeve attached to an attaching portion of the internal combustion engine;
   wherein said piezoelectric element plate is formed in an axis-symmetrical shape so that an axial line of said piezoelectric element plate intersects an attaching face of the attaching portion;
   said main sleeve has an opposite face forming portion that includes an opposite face that contacts the attaching face of the attaching portion; and
   said opposite face forming portion has at least one notch portion which opens in a surface of said opposite face forming portion from said at least one notch portion being formed a prescribed distance away from said axial line, and a relation of K/V is in the range of 0.01 to 0.2 where V is the volume of the main sleeve including the volume of the at least one notch portion, and K is the volume of the at least one notch portion.

2. The knocking detecting sensor according to claim 1, wherein the at least one notch portion opens toward the opposite face.

3. The knocking detecting sensor according to claim 1, wherein the at least one notch portion is formed in said opposite face forming portion so that a depth of the notch portion is parallel to said axial line of said piezoelectric element plate and the thickness of said opposite face forming portion is reduced where said at least one notch portion is formed.

4. The knocking detecting sensor according to claim 1, wherein the at least one notch portion is formed to shift a center of gravity of said sensor closer to said axial line than the center of gravity would be if no notch portion was formed.

5. The knocking detecting sensor according to claim 1, wherein a projecting portion on the attaching face is attached to one of the at least one notch portion formed in the opposite face.

6. The knocking detecting sensor according to claim 1, wherein:
  said piezoelectric element plate is formed in a ring-shape;
  said main sleeve includes a cylindrical or columnar passing-though portion, and a flange portion integrally formed with said main sleeve at one end side of the passing-through portion and extending outwardly along a circumferential direction of the passing-through portion, the flange portion constituting the opposite face forming portion;
  said piezoelectric element plate is fit over the passing-through portion of said main sleeve from an opposite side to a side where the flange portion is formed;
  the flange portion comprises said opposite face and a supporting face, the flange portion supporting said piezoelectric element plate on said supporting face, and said opposite face being at an end surface of the flange portion opposite to the supporting face.

7. The knocking detecting sensor according to claim 6, wherein said at least one notch portion is formed to open in the end surface opposite to the supporting face of the flange portion.

8. The knocking detecting sensor according to claim 1, wherein:
  an outer periphery of said main sleeve is covered with a resin case that is integrally molded therewith;
  said resin case includes a cylinder portion having an open tip, the cylinder portion being formed integrally with the resin case on one side;
  a connection terminal portion for extracting an output from said piezoelectric element plate is provided to penetrate the resin case and to protrude into the cylinder portion, and said connection terminal portion and said cylinder portion constitute a connector portion; and
  said at least one notch portion is formed in said opposite face forming portion at a position corresponding to said connector portion around the axial line.

9. The knocking detection sensor according to claim 6, wherein said knocking detecting sensor is arranged on said attaching portion with the opposite face of said main sleeve in contact with the attaching face and attached to the attaching portion so that a screw member penetrating through said main sleeve is screwed into a female screw hole formed in the attaching portion.

10. The knocking detection sensor according to claim 9, wherein the opposite face of the flange portion is formed in a ring-shape by opening a through-hole for the screw member, and said at least one notch portion is formed on the opposite face.

11. The knocking detecting sensor according to claim 9, wherein said at least one notch portion is engaged with a projecting portion formed on the attaching face.

12. The knocking detecting sensor according to claim 1, wherein the at least one notch portion is formed in an arc-shape.

13. The knocking detecting sensor according to claim 1, wherein the at least one notch portion is tapered and extends from adjacent an inner periphery to an outer periphery of the opposite face.

14. A knocking detecting sensor comprising:
  a piezoelectric element plate for detecting vibration due to knocking generated in an internal combustion engine; and
  a sleeve for supporting said piezoelectric element plate, said sleeve attached to an attaching portion of the internal combustion engine;
  wherein said piezoelectric element plate is formed in an axis-symmetrical shape so that an axial line of said piezoelectric element plate intersects an attaching face of the attaching portion;
  said sleeve has an opposite face forming portion that includes an opposite face that contacts the attaching face of the attaching portion;
  said opposite face forming portion has an inner periphery defining a hole and has at least one notch portion which opens in a surface of said opposite face forming portion, said at least one notch portion being formed a prescribed distance away from said axial line, said attaching portion has at least one projecting portion, and the at least one notch portion is formed in a substantially rectangular shape and extends from said inner periphery to an outer periphery of the opposite face.

15. A knocking detecting sensor comprising:
  a piezoelectric element plate for detecting vibration due to knocking generated in an internal combustion engine; and
  a sleeve for supporting said piezoeletric element plate, said sleeve attached to an attaching portion of the internal combustion engine;
  wherein said piezoelectric element plate is formed in an axis-symmetrical shape so that an axial line of said piezoeletric element plate intersects an attaching face of the attaching portion;
  said sleeve has an opposite face forming portion that includes an opposite face that contacts the attaching face of the attaching portion;
  said opposite face forming portion has at least one notch portion which opens in a surface of said opposite face forming portion and at least one projecting portion which extends from the surface of said opposite face forming portion.

* * * * *